(12) United States Patent
Hodge et al.

(10) Patent No.: US 8,298,054 B2
(45) Date of Patent: Oct. 30, 2012

(54) SYSTEM AND METHOD FOR MANUFACTURING

(75) Inventors: Geoffrey Hodge, Sutton, MA (US); Parrish Galliher, Littleton, MA (US); Michael Fisher, Ashland, MA (US)

(73) Assignee: Xcellerex, Inc., Marlborough, MA (US)

( * ) Notice: Subject to any disclaimer, the term of this patent is extended or adjusted under 35 U.S.C. 154(b) by 1397 days.

(21) Appl. No.: 11/050,133

(22) Filed: Feb. 3, 2005

(65) Prior Publication Data
US 2005/0226794 A1 Oct. 13, 2005

Related U.S. Application Data

(60) Provisional application No. 60/541,572, filed on Feb. 3, 2004.

(51) Int. Cl.
F24F 7/00 (2006.01)
B01L 1/04 (2006.01)

(52) U.S. Cl. .......................... 454/49; 454/187

(58) Field of Classification Search ............ 454/49, 454/56
See application file for complete search history.

(56) References Cited

U.S. PATENT DOCUMENTS

| | | | | |
|---|---|---|---|---|
| 3,302,615 A * | 2/1967 | Tietje | ........................ | 119/419 |
| 3,318,227 A * | 5/1967 | Nelson et al. | ................ | 454/59 |
| 4,262,091 A * | 4/1981 | Cox | ...................... | 435/253.6 |
| 4,706,553 A * | 11/1987 | Sharp et al. | .................. | 454/61 |
| 4,741,257 A * | 5/1988 | Wiggin et al. | ................ | 454/56 |
| 5,205,783 A | 4/1993 | Dieckert et al. | ............. | 454/238 |
| 5,401,212 A | 3/1995 | Marvell et al. | ................ | 454/187 |
| 5,591,344 A | 1/1997 | Kenley et al. | ................ | 210/636 |
| 5,656,491 A | 8/1997 | Cassani et al. | ............. | 435/283.1 |
| 6,514,137 B1 | 2/2003 | Panelli et al. | ................ | 454/187 |
| 6,555,011 B1 | 4/2003 | Tribelsky et al. | ............. | 210/748 |
| 6,904,912 B2 * | 6/2005 | Roy et al. | ................. | 128/203.18 |
| 2003/0170810 A1 | 9/2003 | Vedadi et al. | ................ | 435/69.1 |
| 2004/0229335 A1 | 11/2004 | Zhang et al. | ............... | 435/235.1 |
| 2005/0239198 A1* | 10/2005 | Kunas et al. | ............... | 435/297.1 |

FOREIGN PATENT DOCUMENTS

| | | |
|---|---|---|
| CA | 2 271 583 C | 4/2002 |
| DE | 199 17 398 A1 | 10/2000 |
| JP | 60-238134 | 11/1985 |
| JP | 2003-062739 | 3/2003 |
| WO | WO 98/52629 | 11/1998 |

* cited by examiner

Primary Examiner — Steven B McAllister
Assistant Examiner — Helena Kosanovic
(74) Attorney, Agent, or Firm — Jacqueline Arendt

(57) ABSTRACT

Embodiments of the present invention are directed to a customizable bio-manufacturing system which includes a manufacturing space having a first air handling system for providing supply air and a second air handling system for handling exhaust air, the supply air system being optionally provided with at least one of filtration, heating, cooling and or humidity control and a plurality of portable modules provided within the manufacturing space. At least one module having an interior capable of being interconnected with another module interior and each module's interior includes one or more components to perform at least one specific task of a biological, chemical, and/or pharmaceutical manufacturing process. At least one module includes an on-board environmental control system for controlling an environment within the module and a connection means for interconnecting the module interior with another module interior. The system also includes a central controller operating to at least perform one or more of operation and information collection for the operation of at least one of the system and one or more modules.

34 Claims, 14 Drawing Sheets

SYSTEM AND METHOD FOR MANUFACTURING

CLAIM TO PRIORITY

The present application claims priority to 35 U.S.C. §119 (e) of U.S. provisional patent application No. 60/541,572, filed Feb. 3, 2004, the entire disclosure of which is incorporated herein by reference.

FIELD OF THE INVENTION

The present invention is directed to manufacturing systems in general, and more specifically, to a flexible manufacturing platform, which includes portable, controlled-environment manufacturing modules having disposable manufacturing components, automation, electronic batch control, record generation, storage and documentation.

BACKGROUND OF THE INVENTION

An axiom in the business world is that between cost, speed and quality, maximizing any two sacrifices the third. Bio/chemical/pharmaceutical manufacturing is no exception. Moreover, a critical factor in bio-manufacturing is quality: products, when made properly, are life-saving, when made improperly are life-threatening.

The speed for producing drugs for clinical trials and speed to market are also important factors, with clinical milestones impacting the value of the drug pipeline, stock values, financing, partnering and licensing opportunities. In addition, the high cost of drug development has been a topic of increasing interest within the industry and appears as part of the public concern about rising health care costs.

Much of the expense of biopharmaceutical manufacturing can be attributed to the capital investment required to build manufacturing infrastructure for producing a particular drug. Ideally, having manufacturing capacity immediately available to support every clinical and commercial need would greatly speed development of drugs. However, the capital investment required to build such bio-manufacturing capacity is too great, especially since facilities would sit idle while waiting for the drug in the development pipeline. The dilemma is compounded by the difficulty to accurately predict production capacity requirements, since development timelines, dosages, market size, clinical success and regulatory approval are all uncertainties. Due to the foregoing uncertainties and the high probability that an individual drug will fail during clinical trials, any investment in facilities to manufacture drugs prior to successful clinical trials and/or regulatory approval is a high risk endeavor.

To reduce such expenses, an ideal bio-manufacturing facility would be one that is inexpensive to build, can be rapidly expanded and reconfigured to handle new processes and produce drugs quickly. Moreover, it would be advantageous for such a manufacturing facility to be able to maintain and improve upon the high level of quality required for current good manufacturing practice (cGMP) for drug manufacture (e.g., conformance with 21 C.F.R. Part 11).

Other manufacturing expenses may be attributable to, for example, the extensive use of non-disposable components. Such components must be cleaned after every use. Moreover, such components are expensive. For example, stainless steel vessels are used extensively in drug manufacturing processes. Such vessels must be connected by stainless steel piping to other unit operations, media and buffer supply, water, and clean-in-place and steam-in-place systems. The fabrication and installation of these vessels, and all the utilities that support them, is expensive and requires considerable lead time to design and manufacture.

Even assuming a bio-manufacturing facility can be built, the resulting facility is often difficult to reconfigure for new processes or cannot be built inexpensively enough to manufacture multiple products simultaneously (the manufacturing scheme must be replicated in several parallel clean room suites, separated by airlocks, accessed through clean corridors and served by dedicated HVAC units). An example of such a traditional bio-pharmaceutical manufacturing system is shown in FIG. 3. As shown, cell culture processes, purification and post viral clearance formulation/filling processes, are all provided in separate areas, with air-locks provided between each manufacturing space. Moreover, inside such clean rooms, manual operations generate reams of paperwork, providing many opportunities for error and long QA review and batch release cycles.

SUMMARY OF THE INVENTION

Embodiments of the present invention are directed to manufacturing systems/platforms which are both flexible and efficient for manufacturing bio-pharmaceuticals (for example). The invention allows, for example, for fixed fermentation and processing equipment used in conventional scale manufacturing suites, for example, having separate environmentally controlled clean rooms which may now be replaced with controlled-environment modules for one or more steps of a drug or biological manufacturing process. The module operations allow for segregation from typical sources of process contamination: e.g., personnel, multi-use equipment and ambient air. In some embodiments, environmental control may be defined as controlling one or more of air flow, heat, cold, humidity and pressure.

The system according to some embodiments may be designed to handle multi-product, concurrent bio/chem-manufacturing in a common, unclassified (or classified) manufacturing space, using a plurality of connected process modules (module train). The ability to use an unclassified space is due to the integrity and control of the environment inside the module for one or more steps of the manufacturing process. Such concurrent manufacturing activities may include both upstream and downstream bio-processing as well as bulk drug substance and drug product filling operations for one or more products.

Modules, according to some embodiments of the invention, may be designed and qualified to provide self-contained manufacturing environments that assure appropriate industry standard environmental quality (e.g., Class 100, Class 10,000). Modules may be connected in any order as dictated by a product's manufacturing process. Thus, the module system of bio-pharmaceutical manufacturing (according to some embodiments of the invention), as well as associated control and monitoring systems, enable the system to offer additional capabilities over and above those of more traditional plants. Specifically, the system supports the rapid reconfiguration and concurrent operation of multiple manufacturing stages, e.g., from culture inoculation to bulk filling, in a common unclassified manufacturing space.

In addition, use of disposable components in some embodiments of the invention allows for a more practical and less expensive platform system by eliminating the need for clean-in-place (CIP) and sterilization-in-place (SIP) operations, thereby minimizing fluid transfer lines (e.g., steam) and corresponding required manipulations. The elimination of these required utilities is significant—modules require only power and/or data connections, and in some cases gasses, to support manufacturing operations.

Some embodiments of the invention also utilize centralized and/or remote electronic monitoring, control, automation and data record production and storage for a manufacturing batch process using a central controller (for example). Process automation may be used to reduce the number of manual operations, resulting in a reduction of operator error and an increase in the operability, efficiency and/or the reliability of the system.

Equipment for bio-processing is contained inside each module, and is typically physically and electronically integrated therein. For example, valves may be attached to a module's wall or an internal frame of the module, control panels may be separated and/or removed to the exterior of a module for ease of access. Motors and drive units may be placed outside the module for ease of access while a pump head or similar process component of the motor/pump/drive unit penetrates (preferably, sealably) into the interior of the module. Sensors for monitoring (environmentally or otherwise) may be also integrated into the body of a module and communicating with the central controller to provide continuous online monitoring of many (if not all) parameters of the operation (e.g., non-viable and viable particulates).

As noted above, the modules and the equipment inside the modules may be controlled and monitored using a central controller unit (e.g., computer system, associated software and user interface). The central control unit may thus be used for setup of modules/module train (i.e., manufacturing process) and allow for verification of correct installation of disposable process components, monitoring, automation, process control and generation of electronic batch records for one or more individual modules and preferably, an entire module train (e.g., the entire manufacturing process). For example, the status of a particular module can be readily discerned and tracked (e.g., clean, dirty, in process, assigned to a specific process, etc.) and the flow of process intermediates and materials into, between and out of modules and/or areas of a manufacturing facility may also be monitored. Monitoring may be accomplished via one or more sensors.

Other aspects of the invention include module portability, which is one factor which attributes to the systems flexibility. Modules may be easily moved from one location to the next for qualification, setup, operation and cleaning. In addition, each module may include connection ports to allow modules to be easily coupled to each other. This enables easy transfer of materials between unit operations, or to containers to enable transfer of materials into and out of modules from the manufacturing space. Access to the interior, to access doors and ports of a module may be accomplished by the inclusion of one or more glove ports, which maintains the environment within the module.

Accordingly, in one embodiment of the invention, a customizable manufacturing system includes at least one module having an interior capable of being interconnected with another module interior, where the module interior includes one or more components to perform at least one specific task of a biological, chemical, and/or pharmaceutical manufacturing process. The at least one module includes an on-board environmental control system for controlling an environment within the module, a connection means for interconnecting the module interior with another module interior and a central controller operating to at least perform one or more of operation and information collection for the operation of the system.

In another embodiment of the present invention, a method for operating a customizable biopharmaceutical manufacturing system is provided. The system includes at least one module having an interior capable of being interconnected with another module interior, where the module interior includes one or more components to perform at least one specific task of a biological, chemical, and/or pharmaceutical manufacturing process. The at least one module includes an on-board environmental control system for controlling an environment within the module, a connection means for interconnecting the module interior with another module interior and a central controller operating to at least perform one or more of operation and information collection for the operation of the system. The method includes one or more of selecting one or more modules each for conducting one or more procedures for a manufacturing process and connecting the one or more modules to the central controller, where the central controller operates to perform at least one of setup, monitoring and control of the one or more modules.

In another embodiment of the invention, a process module for a customizable biopharmaceutical manufacturing system includes an interior capable of interconnection with another module interior, where the module operates to perform at least one specific procedure of a manufacturing process, an environmental control module for controlling an environment within the module, an air inlet, an air outlet, at least one connection port for interconnecting the module with another module and an access for accessing an interior of the module. The process module electronically communicates with a central control unit operational to perform at least one of setup, monitoring, controlling, automating of the operation of the process or module, and managing electronic batch records.

In yet another embodiment of the present invention, a customizable manufacturing system includes a manufacturing space having a first air handling system for providing supply air to one or more modules and a second air handling system for handling exhaust air from one or more modules, the supply air system being optionally provided with at least one of filtration, heating, cooling and or humidity control. The system may also include a plurality of portable modules provided within the manufacturing space, where at least one module includes an interior capable of being interconnected with another module interior and each module's interior includes one or more components to perform at least one specific task of a biological, chemical, and/or pharmaceutical manufacturing process. At least one module of the plurality of modules includes an on-board environmental control system for controlling an environment within the module and a connection means for interconnecting the module interior with another module interior. The system also includes a central controller operating to at least perform one or more of operation and information collection for the operation of at least one of the system and one or more modules.

Still other embodiments of the present invention are directed to individual module units as well as computer application programs and media for accomplishing any methods for operating the module system. Accordingly, these and other embodiments, objects and advantages of the present invention will become more clear in the detailed description of the embodiments of the invention and attached FIGS. 1-11. A brief description of the figures is set out below.

DETAILED DESCRIPTION OF THE EMBODIMENTS

Figure 1A:
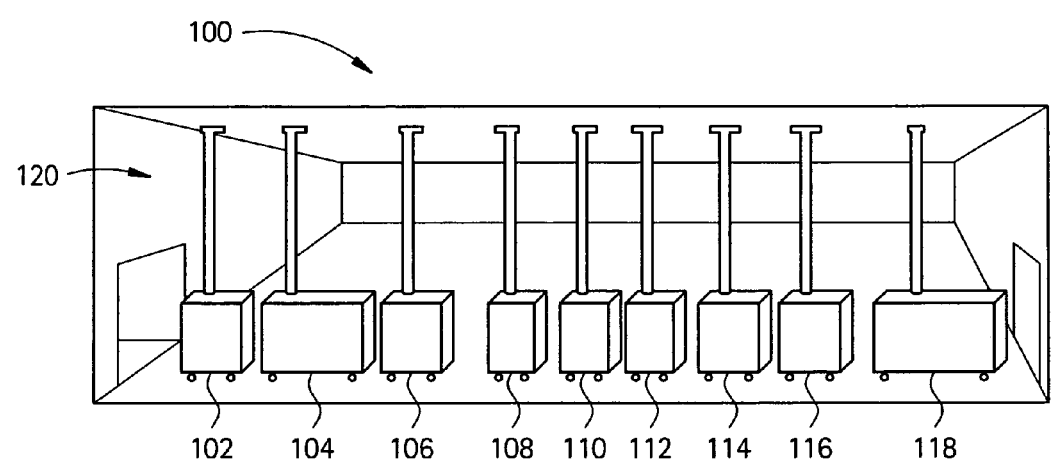
FIG. 1A illustrates a perspective view of a manufacturing space and corresponding module train according to some embodiments of the present invention.
Figure 1B:
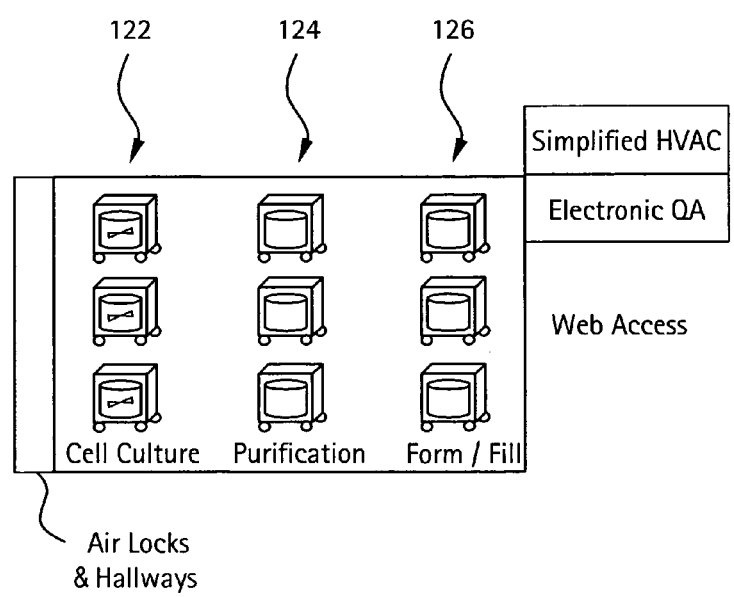
FIG. 1B illustrates a block diagram of a manufacturing space and corresponding modules according to some embodiments of the present invention.

As shown in FIG. 1A, a flexible manufacturing system 100 which may be used to manufacture biopharmaceuticals, or other clean-room type of manufacturing process. As shown, a module train (modules 102-118) may be linked together in a single (common) manufacturing process positioned in a manufacturing space 120, with each preferably having a connection with an air handling system in the manufacturing space. FIG. 1B illustrates an overview of the types of processes that may be housed in specific modules interconnected in a single room. Such processes may include culturing of cells (122), recovery and purification modules (124) and post viral clearance formulation and filling modules (126). Each module may access an air-handling (supply/exhaust) system included in the manufacturing space via one or more snorkels.

As noted above, the common manufacturing space (see FIG. 2) may generally include a dedicated air handling system providing air quality equivalent to laboratory grade and controlled room temperature to the common manufacturing space. The common manufacturing space may also include a dedicated air handling system for providing supply air to one or more modules and a second air handling system for handling exhaust air from one or more modules The module air handling systems preferably maintains a unidirectional flow from modules for downstream processes to modules for upstream processes to create a flow of air from the cleaner environment to the dirtier environment. The manufacturing space may include easily cleanable surfaces including laboratory grade vinyl flooring, and is preferably maintained with appropriate housekeeping controls.

As also shown, each of the modules may include a set of wheels so that each module may be easily moved around the space. Other means for maneuvering a module are also within the scope of the described embodiments (e.g., trolley system). As shown in FIG. 1A, each module may be designated with the acronym "_OW"—which means, "on wheels" (i.e., the mobility of the modules). Accordingly, the modules may include SOW (seed culture on wheels), BOW (bioreactor on wheels), PROW (primary recovery on wheels), COW (chromatography on wheels), UFOW (ultra-filtration on wheels), BFOW (bulk-fill on wheels) and VOW (vialing on wheels).

Figure 2:
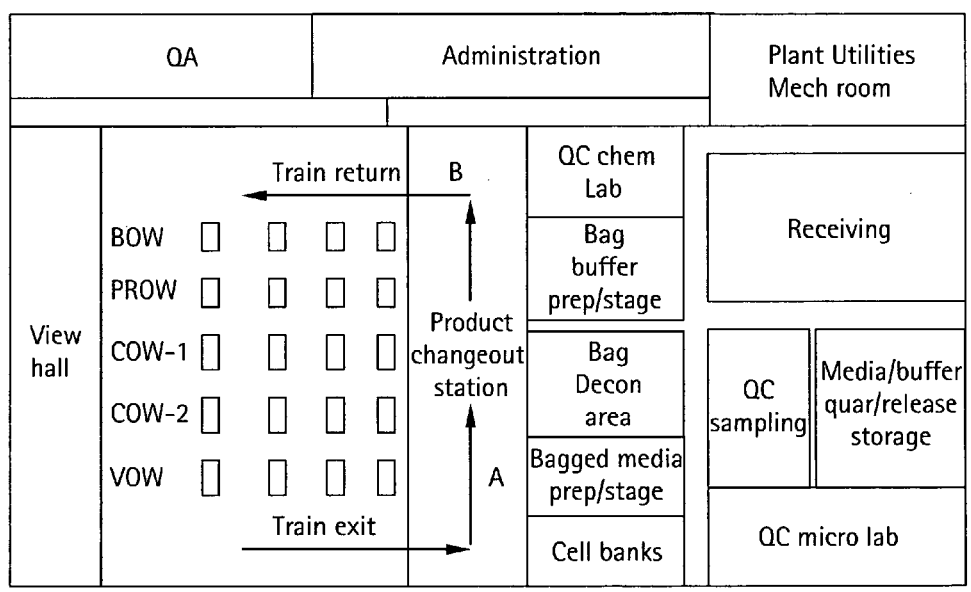
FIG. 2 illustrates a block diagram of a manufacturing space and corresponding modules and support areas according to some embodiments of the present invention.
Figure 3:
FIG. 3 illustrates a block diagram of a traditional manufacturing plant.

As shown in FIG. 2, the manufacturing space may be directed to a space for manufacturing bio-pharmaceuticals (for example) and may include additional areas, preferably adjacent the manufacturing area. Such additional areas may include a quality assurance (QA) sections, administrative sections, plant utilities (air-handling, electrical and plumbing), quality control areas, laboratory and receiving areas.

The manufacturing space is preferably arranged according to a flow, which moves modules/train to and from the manufacturing space. Specifically, modules exit the manufacturing space via an exiting area to be received at a product change-out area (arrow A). After processing in the product change-out area, a module may be placed back into the manufacturing space to be re-connected in its respective spot in the module chain (arrows B).

The supply of utilities as well as fresh air and collection of exhaust air from modules may be accomplished through the connections to common air handling equipment and utilities located in the manufacturing space. The HVAC systems supporting modules in the manufacturing space may include two headers extending the length of each process train area, one for supply, and one for exhaust. The supply headers may be sourced from a common supply air handler, with redundant backup. The exhaust may occur through blowers exhausted to the roof through a common header system.

Figure 4:
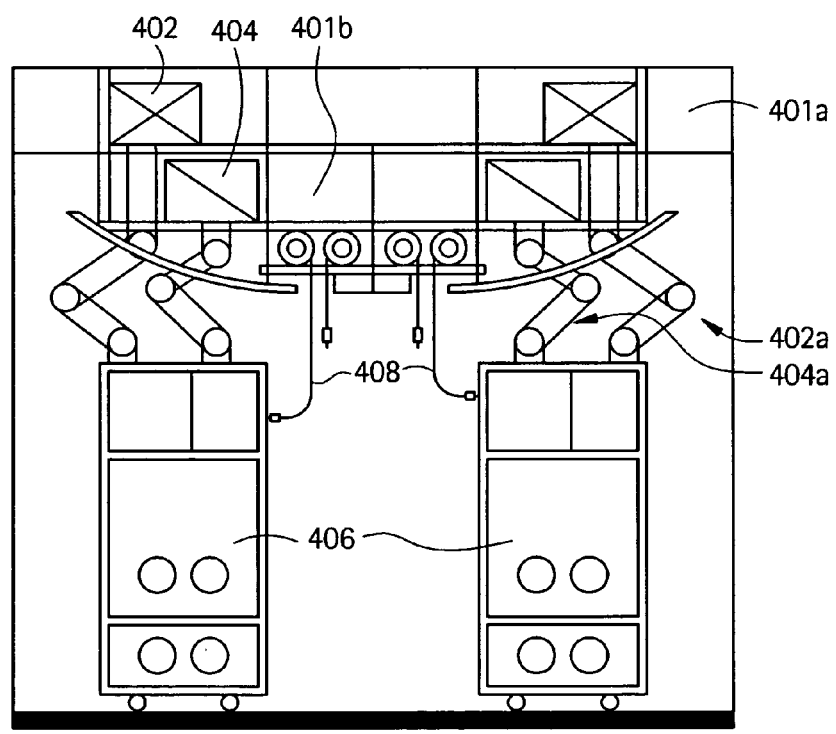
FIG. 4 illustrates a side view of a manufacturing space illustrating support utilities and module connection to air supply and exhaust headers, according to some embodiment of the present invention.

As shown in FIG. 4, the manufacturing space includes a dedicated air handling system 401a, 401b, for the common manufacturing air space, and preferably a separate module specific air handling system. It is worth noting, however, that embodiments of the present invention are not limited to systems where the common manufacturing space and the modules have two separate and distinct air systems, however, such a system is preferable.

The module specific air-handling system generally includes drop-down HVAC snorkels, one 402a for supplying fresh air 402 and one 404a for collecting exhaust air 404 to modules, may be connected to each module 406 (or modules that only require such). Such snorkels may be fully flexible, so as to enable easier connection to each module so as not to restrict a location of a module in the manufacturing space. As also shown, electrical and/or data connections 408 may be made to each module. The air supplied to the modules may be delivered through an air handler that controls temperature (15-30° C.) and relative humidity (10-60% RH). The air is delivered via the flexible snorkel to a module intake blower, where it may be pre-filtered and even HEPA filtered prior to entry into the module. It is worth noting that the system maintains pressure within two interconnected modules such that the more downstream module preferably has a higher pressure.

Figure 5:
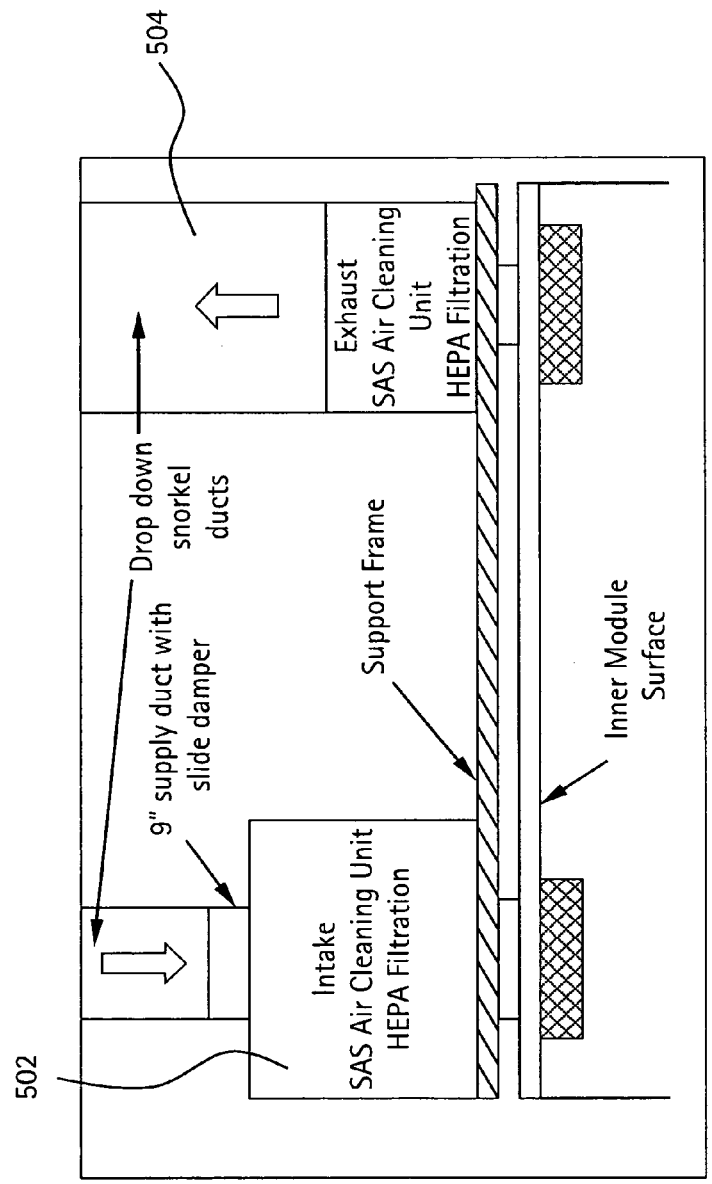
FIG. 5 illustrates a partial side-top view of the air supply and return of a module according to some embodiments of the present invention.

The on-board air-handling system for a module is shown in FIG. 5. As shown, the air handling unit may comprise two separate units: one for supply air 502 and one for exhaust 504, each of which may include separate fans, controls and duct work. In addition, each may include a designate HEPA filtration system. A damper control on the intake or exhaust may be used to regulate module pressurization for positive pressure within the module during processing. For example, using an intake unit rated at 700 cubic feet per minute, the system may maintain 0.1-0.3 inches water column positive pressure within the module.

Figure 6A:
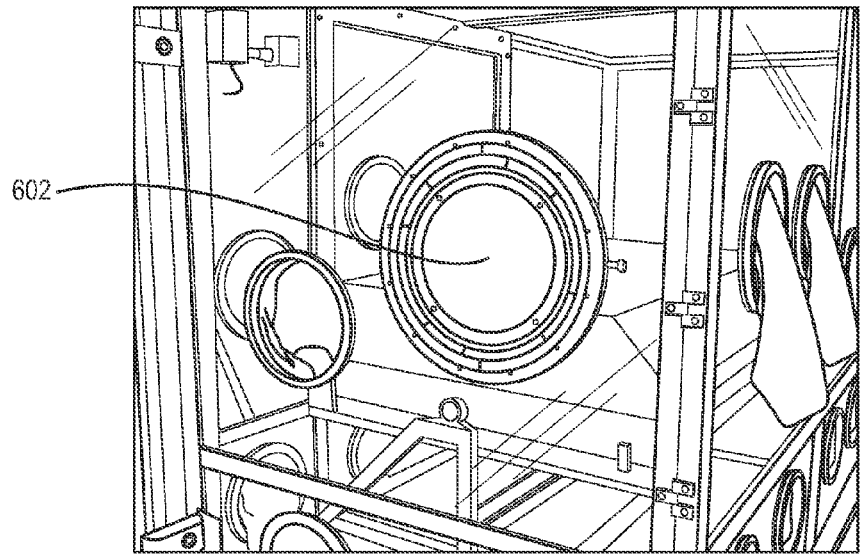
FIG. 6A illustrates a perspective view of a stationary connection port according to some embodiments of the present invention.
Figure 6B:
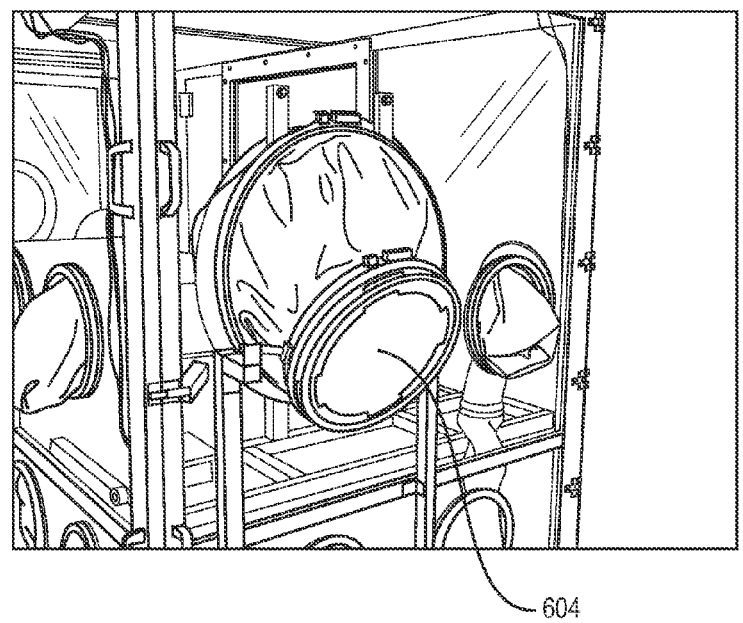
FIG. 6B illustrates a perspective view of a flexible connection port according to some embodiments of the present invention.
Figure 6C:
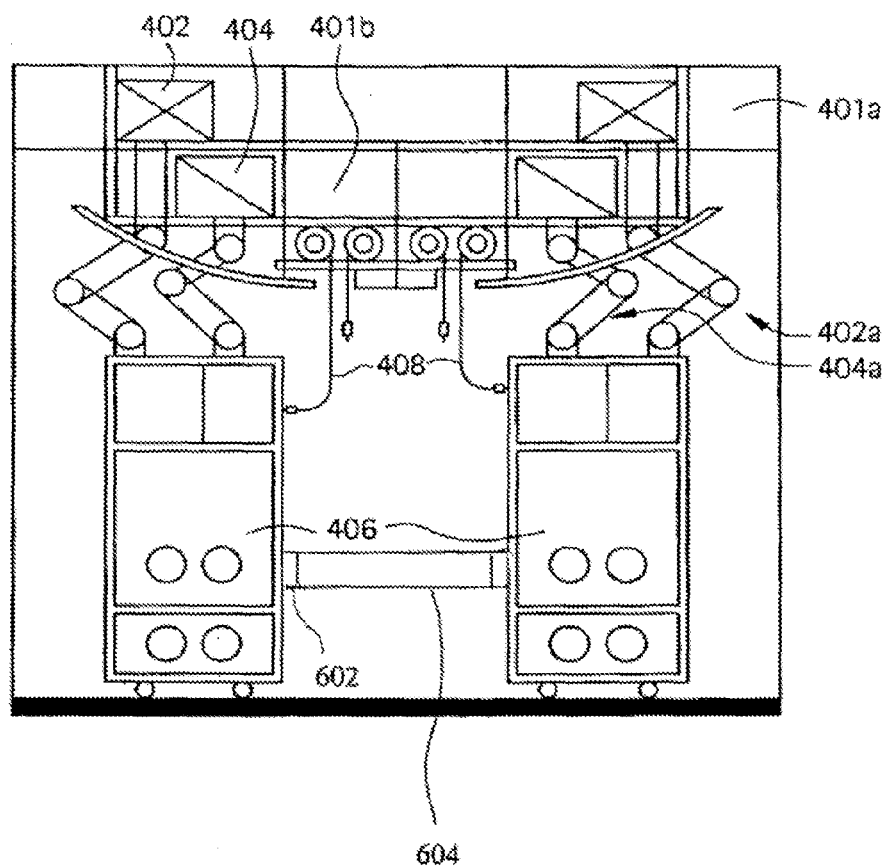
FIG. 6C illustrates a side view of a manufacturing space illustrating support utilities and module connection to air supply and exhaust headers with two modules being connected together.

Modules may be linked to one another via, for example, connection ports as shown in FIGS. 6A and 6B (also see FIG. 6C). Specifically, the ports generally may include an opening sized large enough to pass material from one module to the next, and thus typically may be sized to be under three (3) feet in diameter, and most preferably, between six (6) inches and one (1) foot, although any diameter may be chosen. The connection port preferably includes a flexible connection tube/tunnel that is sealable between modules. Preferably, the tunnel is made of a flexible material.

Preferably, the connection ports include a stationary port 602 and a flexible port 604. Each port preferably includes a clamping member (or other fixation device) for clamping and sealing with a port or tube of an adjacent module. The system may use clamp and gasket technology to hold the sleeve in place and to make a sealed connection.

Figure 7:
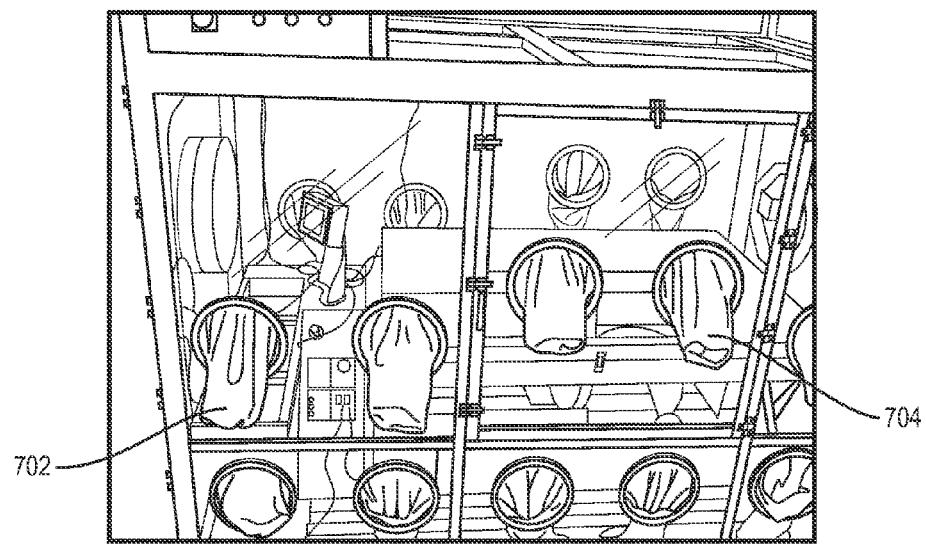
FIG. 7 illustrates a perspective view of an access means according to some embodiments of the present invention.

Containers or components can be transferred between modules through the transfer port connections. The modules preferably remain under positive pressure and will equilibrate when connected. Thus, the environment surrounding the process remains contained and segregated from the ambient environment in the common manufacturing space. Modules may be accessed via, for example, glove ports 702, which may be provided on any side of a module (see FIG. 7), or other access means (e.g., door, window, preferably sealable).

Figure 8B:
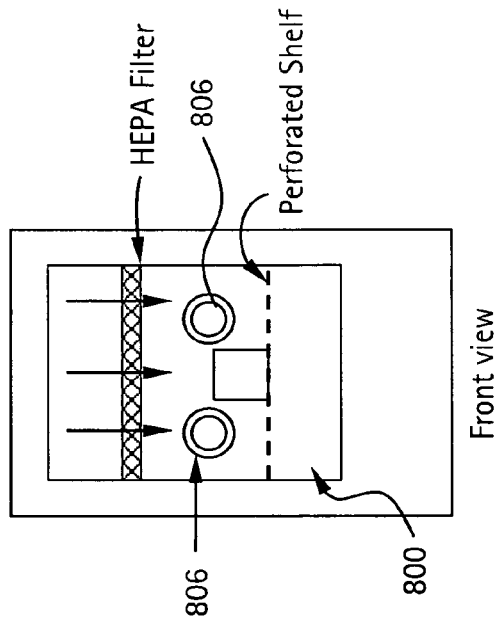
FIG. 8B illustrates a side view of the module having the laminar flow zone illustrated in FIG. 8A.
Figure 8A:
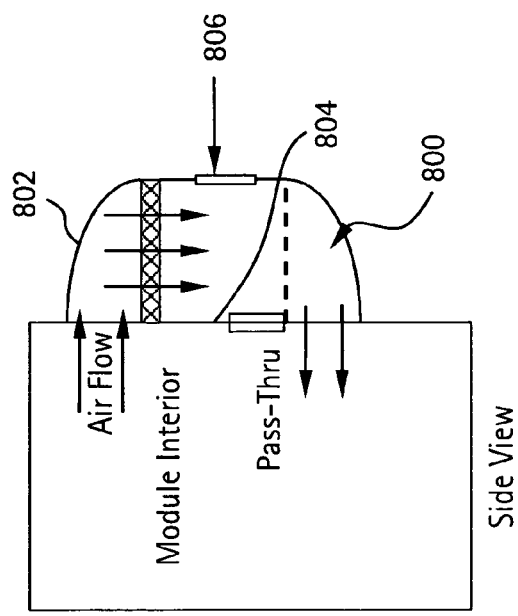
FIG. 8A illustrates a top view of a module having a laminar flow zone according to some embodiments of the present invention.

FIGS. 8A and 8B illustrate a particular embodiment of the present invention for a laminar flow zone for a module 800, which may be applicable to classify particular embodiments for Class 100 classification. The laminar flow zone resides within the module and is supplied by the module HEPA-filtered air (although supply air may also be separately supplied). The laminar zone may also be additionally HEPA filtered. The laminar flow zone is preferably maintained by physical barriers 802, 804 (for example) as shown in the figures. The isolated laminar flow zone may have specific cleaning and operating procedures and may be monitored by the central processor via sensors. Access to the laminar flow zones may be made through glove ports 806 (or specific laminar flow zone specific glove ports). Such specific glove ports may require a sanitization step to sanitize gloves prior use in the laminar zone.

The modules may be constructed of easily cleanable materials. For example, stainless steel or aluminum may be used for their frameworks and glass or plastic (e.g., ¼" Lexan®) may be used for the walls of a module. Modules may also be constructed of frameless plastic (e.g. injection molded). Each module is preferably sealed from the surrounding environment using Room Temperature Vulcanizing (RTV) silicone (for example) for joints, and corrosion-resistant gaskets for doors and ports. Each module may also be outfitted with sealed electrical ports and on-board HVAC system(s).

Modules may also be constructed with a bottom sump container sized to hold, for example, a maximum process volume handled in the module. Construction of the sump permits retention of the process fluid within the module in the event of a catastrophic rupture of a process container therein. Once collected, process fluid may be treated in the sump and/or then removed through a low-point drain (for example) which may be opened by a ball valve and directed either to a drain or to an additional collection container for further treatment. Such a sump design prevents catastrophic spills from being leaked to the common manufacturing space.

Figure 9:
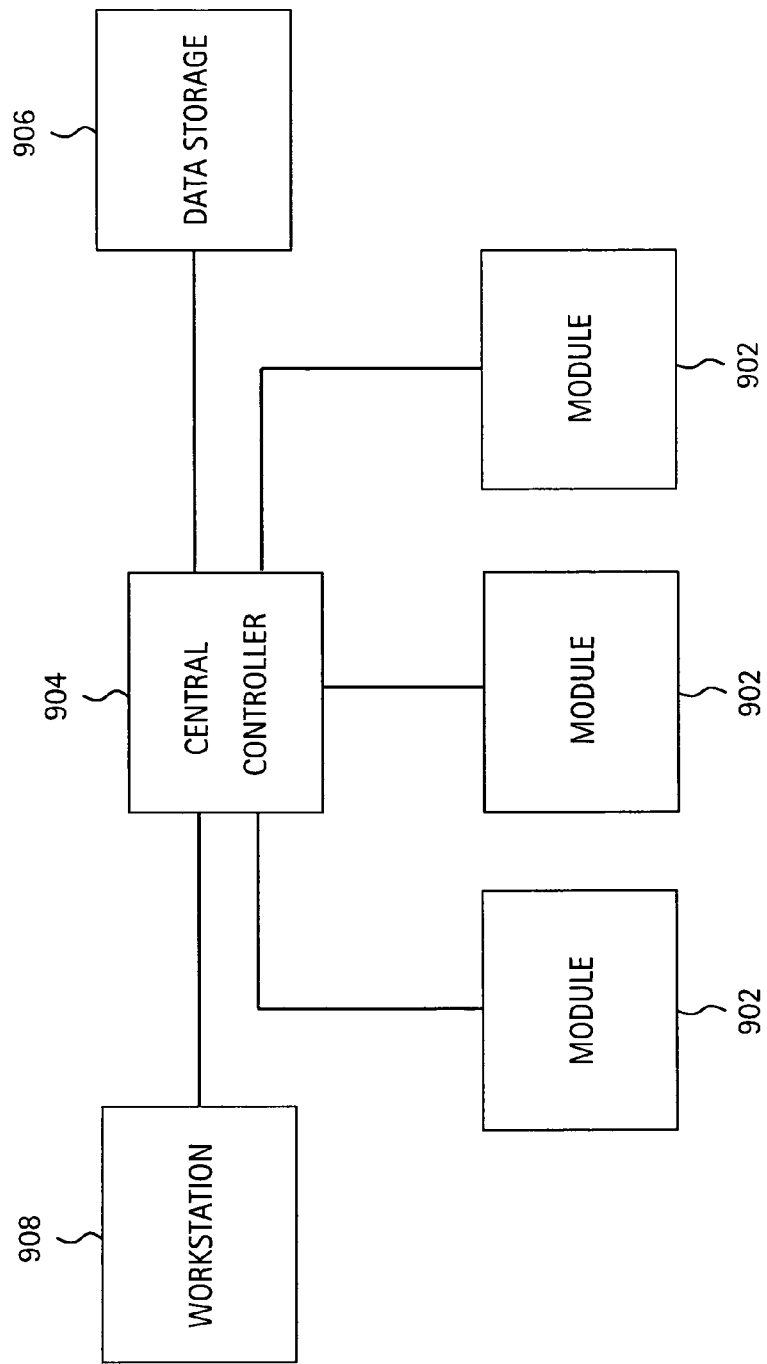
FIG. 9 illustrates a block diagram of a module train and central controller arrangement according to some embodiments of the present invention.

In some embodiments of the invention, the processes taking place within each module are computer controlled and monitored via a computer system and corresponding software (together "central controller"), which also allows automation of the system. Thus, as shown in FIG. 9, which illustrates a block diagram of the system arrangement, the equipment located in each module 902 may include data collection sensors and controls which may be in communication with the central controller 904 either via hardwire or wireless connection. Each module may additionally include an electronics control panel, which may also be used to monitor, collect and control the module and processes occurring therein. The central controller may also include data storage 906 to store data as well as application and/or operation software for the central controller and system operation. The software may include a graphical-user-interface (GUI) displayable on a workstation 908. The GUI may display a number of different screens for setting up, monitoring and controlling the modules and the overall manufacturing process.

Accordingly, such software may be used to control a procedure of a module, and may be customized via the central computer and/or an electronic control panel on a module. A procedure is a strategy for carrying out a particular process in a module (i.e., material produced or that has been produced by a single execution of a batch process). A process may be a sequence of chemical, physical or biological activities for the conversion, transport, or storage of material or energy.

Other Considerations

Qualification testing (IQ/OQ/PQ) of all module mounted HVAC systems may include pressure monitoring, smoke testing, and particulate sampling and testing. Specifically, qualification of module air handling systems may be accomplished in a manner consistent with normal process suite classifications for typical manufacturing systems. For example, a bioreactor fermentation module may be operated as unclassified, while purification modules may be classified as Class 10,000. Seed and bulk drug substance fill module environments may be classified as Class 100 environments.

Figure 10:
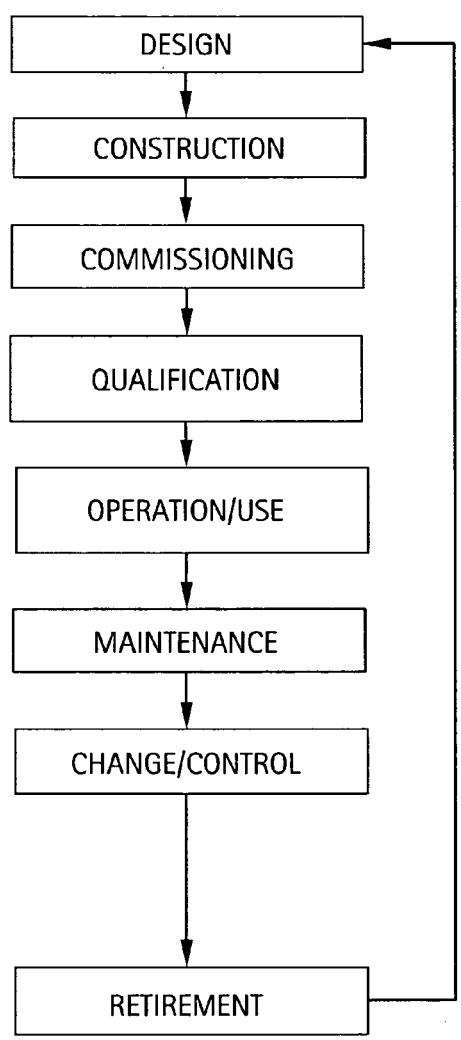
FIG. 10 is a flow chart illustrating a qualification lifecycle for modules according to some embodiments of the present invention.

For quality assurance in some system embodiments of the present invention, each module may have a qualification lifecycle. Specifically, as shown in FIG. 10, the qualification lifecycle of a module includes: design, construction, commissioning, qualification, operation/use, maintenance, change control and retirement (for example). Such qualification activities may include:

Installation Qualification (generally applied to modules and process equipment): documentation list, hardware/software specification verification, physical evaluation and verification, and calibrated instrument verification.

HVAC Operational Qualification: pressure control verification, air flow velocity verification, HEPA filter performance certification, and air flow pattern characterization and verification.

Bioreactor Module Operational Qualification: module operations (power, communications, blowers, lights, door function, port connections, sensor verification, etc.), bioreactor operations (temperature control, gas flow control, agitation control, safety features, disposables installation, filling, mixing, sampling and transfer of materials), and ancillary equipment operation (pumps, tube welders, sensors).

Chromatography Module Operational Qualification: Module Operations (Power, Communications, Blowers, Lights, Door Function, RTP Connections, Sensors, etc.), chromatography operations (column packing and HETP qualification, flow path verification, adsorption pressure verification, bubble trap function, safety features, liquid transfer and collection, buffer feed valve control and function, and ancillary equipment operation (pumps, sensors).

Figure 11:
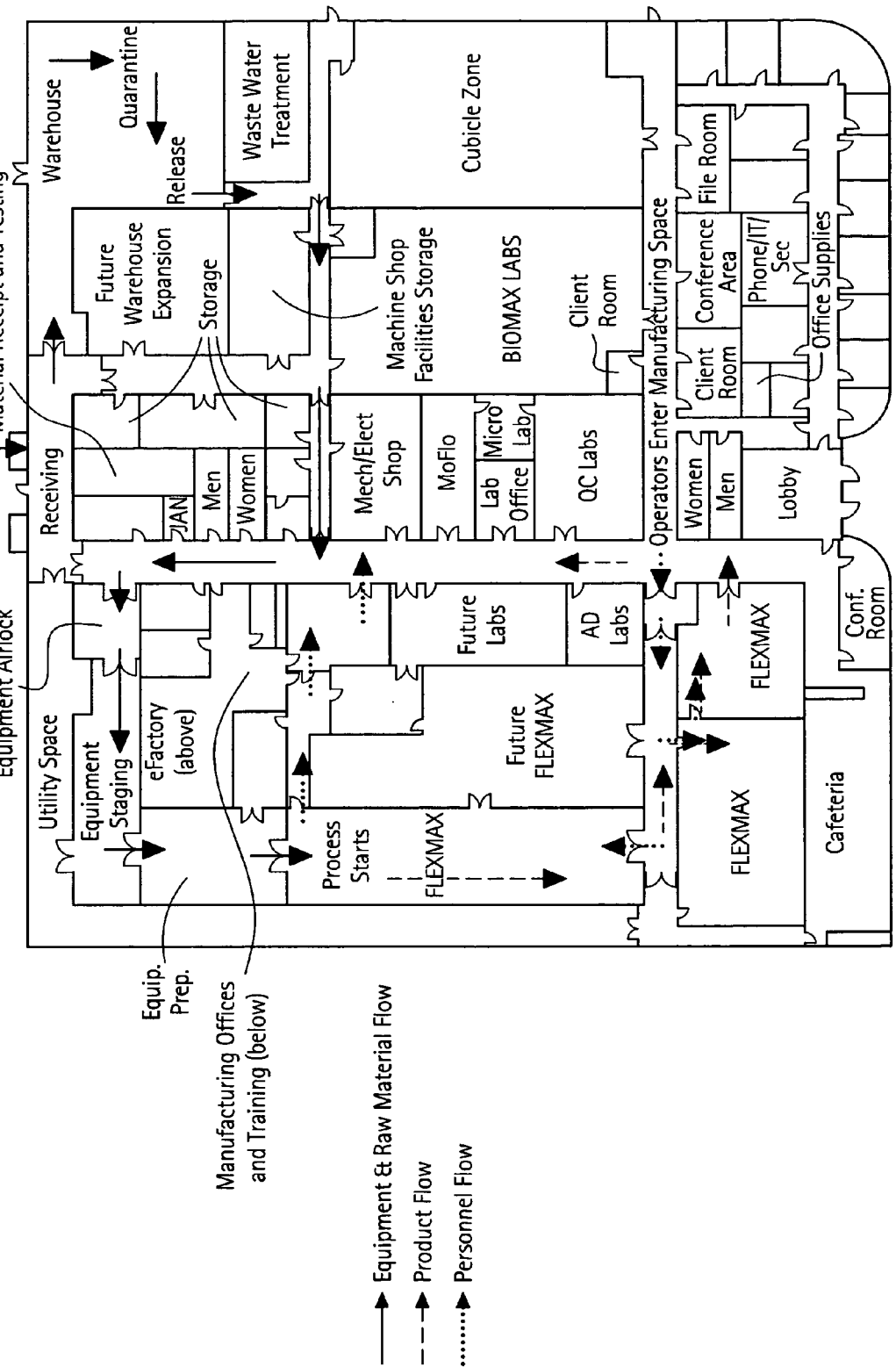
FIG. 11 is an architectural plan illustrating product, process and personnel flow for a manufacturing facility according to the present invention.

Filtration Module Operational Qualification: module operations (power, communications, blowers, lights, door function, port connections, sensor, etc.), filtration system operations (flow control, disposables installation, filling, mixing, sampling and transfer of materials), ancillary equipment operation (pumps, sensors), To work effectively as a multi-product manufacturing environment, embodiments of the present invention may include predetermined material and personnel work flows. An example of such flows are illustrate in FIG. 11. Specifically, materials are received at a warehouse portion and stored in an appropriately controlled quarantine area. Materials may then be sampled in a Raw Materials Sampling Room, preferably provided adjacent the receiving area, to conduct quality control inspection. Upon Quality Control (QC) release, the materials are then available for manufacturing use and moved to a segregated and controlled storage area within the warehouse. It is worth noting that the areas on FIG. 11 designated "FLEX-MAX" corresponding to common manufacturing spaces.

Materials may be transported into the common manufacturing space with personnel or through a separate entrance for large materials and equipment. Materials transported into or out of the common manufacturing space are preferably transported in sealed containers to maintain environments. Transport of shedding materials into the common manufacturing space is preferably minimized, and surfaces of containers and equipment are preferably wiped down with sanitizing agent in the equipment staging area before entering the manufacturing area. During batch setup activities, components are preferably prepared and loaded into modules. Exposed exterior package may be wiped with sanitizing agent prior to being loaded into the appropriate module.

Product may be manufactured by sequential batch operations and transferred from one module to the next. At the end of each batch process operation, modules may be coupled via the connection ports and product transferred (either in closed containers or by pumping through tubing from one module to the next). Intermediate process materials or final bulk substances are sealed in containers before removal from the modules. When transferring from an unclassified module to a class 10,000 module, appropriate measures are used to isolate the different environments. Intermediates, work-in-process, or product may be stored at the appropriate specified environmental conditions in designated storage areas.

Liquid process waste may be inactivated chemically by use of appropriate methods know to those of skill in the art, as needed, and then pumped to a pH neutralization system for discharge per applicable codes. Solid process waste may be bagged and disposed using methods appropriate for the waste.

Regarding personnel flows, preferably, all personnel flows revolve around the common manufacturing space. Access to this space is restricted to authorized personnel, with separate entry and exit paths to maintain the cleanliness of the common manufacturing space.

Basic gowning requirements for entering the common manufacturing space may include such items as non-shedding lab coats, safety goggles, bouffant hair covers, boots, and gloves. Since modules preferably provide environmental control around the process housed therein, movement of the operators (outside the modules) need not be unduly restricted (i.e. appropriately trained operators may work on all in-process modules in the common manufacturing space, for all (or most) unit operations or processes).

Baseline data for the common manufacturing space is collected as part of qualification activities and compared with module data. The evaluation of the module cleaning procedures may employ surface sampling for viable microorganisms by both swab and contact plate sampling. Sample sites are selected from appropriate locations on module surfaces, equipment surfaces, glove surfaces, and materials/components added to the module for manufacturing. Evaluation under dynamic conditions may consider multiple activities occurring within a single module, as well as other activities such as concurrent module processing or module cleaning that might be occurring within the common manufacturing space. Aspects such as personnel operations, cleaning procedures and the materials/component sanitization procedures are also be evaluated, as are excursion events such as spills inside and outside the modules.

The majority of product contact surfaces generally include disposable, single-use equipment and components, eliminating the requirements for cleaning and sterilization which are typically required for multi-use equipment. Additionally, use of disposable contact surfaces eliminates the possibility of product cross-contamination. Typical disposable components include bioreactor vessels, shake flasks, hollow fiber capsules, filters, tubing, connections, temperature probes, bulk storage bags, and chromatography capsules. Such disposable components may also be subject to qualification.

It is recognized that non-disposable products are also used for manufacturing processes. When use of disposable product contact material is not possible, such as in the case of certain sensors and chromatography system component fittings, the methods and systems according to some embodiments of the present invention are used to minimize cross-contamination. Control aspects for small fittings and sensor surfaces may include dedicating equipment to a specific module and employing qualified manual cleaning procedures.

Modules are preferably designed to allow GMP operations typically found in bio-therapeutics manufacturing and may be constructed independently of one another and then connected, as needed, via the connection ports in a process-specific sequence. Examples of some various potential process steps and the corresponding module configurations are described below in Table I.

TABLE I

| Process Class | Process Description | Typical Equipment |
| --- | --- | --- |
| Bioreactor | Culture initiation to production scale cell culture bioreactors | Disposable bioreactors Incubators, tube welders, pumps, gases, scales, process vessels (bags) |
| Filtration | Tangential flow filtration, dead end filtration, diafiltration | Filters (capsule, hollow fiber), pumps, tube welders, scales, process vessels (bags) |
| Chromatography | Dedicated column processing with buffer feeds, sensors, and product collection | Chromatography Columns, chromatography media, pumps, scales, process vessels (bags) |
| Chromatography Filtration | Combined unit operations | Typical for post-chromatography filtration requirements for storage or virus/endotoxin removal |

TABLE I-continued

| Process Class | Process Description | Typical Equipment |
|---|---|---|
| Bulk Drug Filling | Filling bulk drug substance liquid into bottles, closing and sealing | Filling head |
| Drug Substance Filling | Aseptic filling of sterilized drug substance (e.g. vialing, stoppering) | Filling head, vialing equipment |

Module Lifecycle

Figure 12:
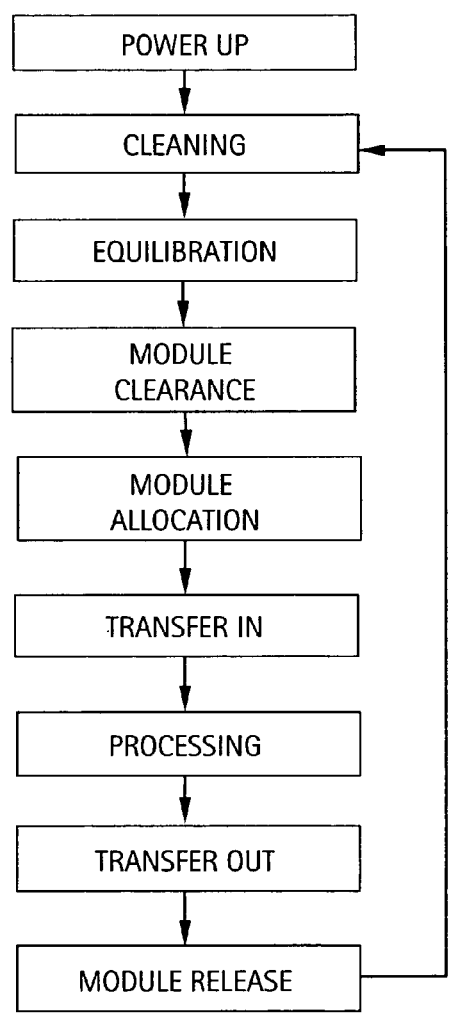
FIG. 12 is a flow chart illustrating a module life cycle according to some embodiments of the present invention.

During the Operation/Use Phase, the module generally makes the following activities as illustrated in FIG. 12. Table II provided below includes details on the activities performed during various operational stages.

TABLE II

Module Operational Stages

| Module Operational Stage | Detail of Activities Occurring in Module |
|---|---|
| Power-up | Electrical, utility and data connections established and checked |
| Cleaning | Cleaning procedure executed |
| Equilibration | Post-cleaning, module sealed Differential pressure, particle counts, temperature and humidity reach equilibration conditions |
| Module Clearance | Module release to scheduled batch Disposables and supplies loaded Checklist review of critical operating states and preparation |
| Module Allocation | Module is assigned (allocated) electronically to process a specific batch/lot number for its unit operation. No other batch records allowed to process in the module |
| Transfer In | Process fluids transferred from source module to subject module |
| Processing | Unit operation is executed per batch record |
| Transfer Out | Process fluids transferred from subject module to destination module |
| Module Release | Module is released from assigned batch, identified as "Dirty" and scheduled for cleaning |

Startup Verification

Modules that are taken offline (i.e. disconnected from power and data connections), are processed or modified through offline events such as decontamination, modification, or reconfiguration, may be tested upon being re-connected. Testing verifies that the module is sufficiently powered, operational, and communicating to the SCADA (supervisory control and data acquisition) system. The method of verification involves physical reconnection, power-up (supplying all powered components and verifying operation), and data connection (manipulation of sensors to induce changes on SCADA instrument value, verifying expected response.

The Startup Verification applies only to modules removed from the manufacturing floor in response to process-driven events, and IS NOT a substitute for Qualification or Re-Qualification for modules modified through change control procedures, although the Start-Up Verification may be a component of the qualification.

Design and Procedural Controls

Modules are preferably designed to provide a controlled environment around each unit manufacturing process. Fermentation and primary recovery may be performed in modules operated as unclassified space, while downstream purification may be performed in a Class 10,000 environment. Inoculation and bulk drug substance filling may be performed in Class 100 environments. Exemplary key attributes that contribute to control of the module environment may include:

- closed modules in which manual operations are conducted through glove ports;
- individual, segregated air handling systems that provide one pass, HEPA filtered air to the module;
- operation of module under positive pressure during manufacturing, operation and cleaning;
- control and continual monitoring of temperature, humidity, airflow and particulates;
- routine environmental monitoring program that includes automated, continuous, on-line monitoring of modules during manufacturing for total particulates with alarms for out-of-tolerance events;
- routine sampling of classified modules for viable particulates in accordance with industry standards for controlled environments;
- limited access to the common manufacturing space with separate entry and exit paths;
- gowning of personnel entering common manufacturing space including lab coats, boots, bouffant hair covers, gloves and safety goggles;
- materials transported into or out of common manufacturing space in sealed containers; surfaces wiped with sanitizing agent before entering manufacturing area;
- transfers between coupled modules accomplished by pumping through tubing or transfer of sealed containers via RTP (rapid transfer port) or similar;
- removal of final bulk product or intermediate in sealed containers;
- liquid process waste inactivation prior to removing from module;
- solid waste removed in sealed bag;
- modules designed for containment of large spills and inactivation of spill before removal via closed system;
- procedures for abnormal events similar to those used in traditional facilities;
- validated cleaning procedures executed with verification step in electronic batch record steps;
- clean status requires completion of procedure, including appropriate environmental monitoring;
- clean status of modules tracked by electronic documentation system; "clean" status required in order for module to be assigned to a batch;
- validation of module integrity and air handling system under static and dynamic conditions of normal use and abnormal events such as spills, power failures;
- cleaning validations support and substantiate module cleaning procedures and multi-use equipment/process component cleaning procedures;

Table III includes information related to controls for ensuring product/process segregation.

TABLE III

| Control | Description |
|---|---|
| Material Staging | Materials requested from warehouse and staged in a manufacturing area according to a defined production schedule. Materials labeled for client-specific allocation or general operational use. Labeling may be by use of sticker, barcode, combination, or other means of secure and accurate identification. |
| Material allocation to batch and module | Materials may be assigned to specific batches in the staging area and, upon a module becoming available, transferred to a specific module for a specific batch. The batch record may include a bill of materials for each operation in each module. A Module (Line) clearance procedure is executed as verification of correct preparation. |

TABLE III-continued

| Control | Description |
| --- | --- |
| Batch allocation to module | Module clearance permits the assignment of a scheduled batch to a specific module. Electronic allocation prevents any other batches or operations to be executed in the assigned module. |
| Processing | During processing, routine and excursion events may be predetermined by procedure and programmed electronically in the central control module and electronic-batch records where appropriate. The controls are generally pre-determined to control normal processing events and to prevent abnormal events from impacting other modules. |
| Batch release from module | At the end of a unit operation in a module, product is transferred to its next unit operation. Upon completion of transfer, the module is electronically released from the batch and scheduled for cleaning. The cleaning and inspection cycle is preferably required to be completed prior to allowing the next batch to be allocated to the module. |
| WIP, Intermediates and product storage | Any materials removed from the modules for storage are to be placed in a sealed and labeled container. |
| Excursion Event Matrix | In the event of an excursion that may have adverse product quality impact, an excursion event/response plan (Table IV) ensures adequate and timely assessment of the occurrence and its impact. |

TABLE IV

Excursion Event Information

| Event | Response Range | Requirement |
| --- | --- | --- |
| Air Supply Header Failure | Turn off exhaust blowers, modules inactive and ambient | Qualify and monitor recovery time needed to reach normal particle count, temp, and DP |
| Air Exhaust Header Failure | Maintain positive differential with air supply, modules inactive | Qualify and monitor recovery time needed to reach normal particle count, temp, and DP |
| Air Supply Local Failure | Maintain positive differential with header air supply, modules inactive | Qualify and monitor recovery time needed to reach normal particle count, temp, and DP |
| Air Exhaust Local Failure | Maintain positive differential with header air supply, modules inactive | Qualify and monitor recovery time needed to reach normal particle count, temp, and DP |
| Power Loss | Modules Inactive, Ambient until power restored | Qualify and monitor recovery time needed to reach normal particle count, temp, and DP |
| Module Surface Rupture - Minor | Minor - monitor status of rupture, repair or patch, continue as Active | Evaluate process impact case-by-case, Monitor recovery to reach normal particle count, temp, and DP |
| Module Surface Rupture - Major | Major - Inactive, Repair | Transfer process fluids out of module, take offline and repair Determine process status case by case |
| Module Glove Rupture - Minor | Minor - monitor status of rupture, repair or patch, continue as Active | Evaluate process impact case-by-case, Monitor recovery to reach normal particle count, temp, and DP |
| Module Glove Rupture - Major | Major - Inactive, Repair | Transfer process fluids out of module, take offline and repair Determine process status case by case |
| Minor Process Fluid Spill | Minor - monitor status of rupture, repair or patch, continue as Active | Evaluate process impact case-by-case, Clean spill area using glove ports Clean vigorously at interbatch cleaning |
| Minor Chemical Spill | Minor - monitor status of rupture, repair or patch, continue as Active | Evaluate process impact case-by-case Clean spill area using glove ports Clean vigorously at interbatch cleaning |
| Major Process Fluid Spill | Major - Inactive, Repair | Transfer process fluids out of module Take offline and repair Decontaminate |
| Major Chemical Spill | Module becomes Inactive, in need of Repair | Transfer process fluids out of module Take offline and repair Decontaminate. |
| Module Door Open | Maintain positive differential pressure, Module Active | Continue processing Evaluate and then collect and analyze additional process samples record event |
| Negative Differential Pressure | Verify sealed process containers, module inactive, ambient after exhaust blowers turned off | Evaluate process impact case-by-case, Qualify and monitor recovery time needed to reach normal particle count, temp, and DP |

Some embodiments of the present invention also include on-line quality assurance and cGMP compliance verification, including electronic GMP data management using a controlled and qualified database system with qualified applications and hardware customized to specific practices to enable dock-to-dock tracking of raw materials, equipment, manufacturing components, work-in-process intermediates, and final product. This allows for a paperless system which captures electronic data in a repository allowing for continuous, "real-time" review and decision making, resulting in quality assurance and procedural compliance. Additionally, the system may also include a capability to generate paper versions of the electronic reports.

Accordingly, some of the online system components may include electronic materials control, electronic document control, electronic batch records, automated process controls, real time automated monitoring of processing and environment inside the modules, real-time, automated collection of batch and environmental data.

Online QA capabilities may be created to meet the requirements of 21 CFR Part 11 requirements and take into consideration the evolving expectations for software development and validation. Real time quality assurance facilitates efficient assessment/evaluation of batch disposition as data are acquired. Process excursions which may have adverse product quality impact on a real time basis may be identified and assessed in a timely manner.

Data from the manufacturing process may be collected continuously and used to control process equipment and determine batch sequencing permissions. The types of data that are preferably continuously collected are detailed in Table V.

TABLE V

Continuously Collected Process Control Data

| Typical Data Points | |
|---|---|
| Material Transfer | |
| Lot Details | Lot Status, Quantity, FIFO Status |
| Location | Warehouse, shelf, rack number |
| Lot Completion | Reconciliation |
| Analytical Instruments and Testing | |
| In-Process Data | pH, Conductivity, bioburden, endotoxin, surface sampling, TOC, $A_{280}$, FTIR, UV |
| Batch Release Data | Bioactivity, potency, impurity profile, concentration, physicochemical characteristics |
| Batch Execution/Processing | |
| Batch Initiation and Execution | Lot number assignment, sequential control and status, comments, deviations, parameter entries, signatures |
| Bill of Materials | Status verification, usage and disposition |
| Batch Completion | Compliance assessment/Status |

Central Control Module

Electronic process controls, batch records, Standard Operating Procedures (SOPs), and data capture may be incorporated into a central control unit. The control unit allows the incorporation of real-time monitoring and control of various parameters of the manufacturing processes. Such monitoring allows operator interaction with minimal intrusion into controlled areas as well as minimize the chance of human error. Examples of such process analytical components are described in Table VI.

TABLE VI

Process Analytical Technologies

| Process/Operation | Typical Data Monitored |
|---|---|
| Modules | Module Temperature, Relative Humidity and Differential Pressure, Particle Counts, Status, Active Batches |
| Bioreactors | Reactor Setpoints, Temperature, Agitation, Gas Flowrate, pH, Dissolved Oxygen, Weight/Volume/Level, Pressure, Consumables, Subsystem and System Status, Metrology, Maintenance and Validation Status |
| Filtration Systems | Pressure, Volume/Weight/Level, Flowrate, pH, Conductivity, Consumables, Subsystem and System Status, Metrology, Maintenance and Validation Status |
| Chromatography Systems | Pressure, Volume/Weight/Level, Flowrate, pH, Conductivity, UV Wavelength, Consumables, Subsystem and System Status, Metrology, Maintenance and Validation Status |
| Filling Systems | Pressure, Volume/Weight/Level, Flowrate, pH, Conductivity, Consumables, Subsystem and System Status, Metrology, Maintenance and Validation Status |

Having described the invention with reference to the presently preferred embodiments, it should be understood that numerous changes in creating and operating such systems and methods may be introduced without departing from the true spirit of the invention.

We claim:

1. A customizable, modular, clean-room type manufacturing system as an alternative to separate environmentally controlled clean rooms, the manufacturing system comprising:
a first module comprising a first module interior segregating a first environment of the first module interior from an ambient environment outside of the first module, and a first on-board environmental control system for controlling the first environment within the first module interior, wherein the first on-board environmental control system maintains the first environment at a positive pressure relative to the ambient environment, the first on-board environmental control system comprising a first air handling system for providing a first module supply air to the first environment and a second air handling system for handling a exhaust air from the first environment;
a first component disposed within the first module interior and configured to perform a first specific task chosen from a biological and a pharmaceutical manufacturing process, and a combination thereof, with the proviso that the first specific task is not that of controlling the first environment within the first module interior;
a second module comprising a second module interior and segregating a second environment within the second module interior from the ambient environment outside of the second module, and a second on-board environmental control system for controlling the second environment within the second module interior, wherein the second on-board environmental control system maintains the second environment at a positive pressure relative to the ambient environment, the second on-board environmental control system comprising a third air handling system for providing a second module supply air to the second environment and a fourth air handling system for handling exhaust air from the second environment;
a second component disposed within the second module interior and configured to perform a second specific task chosen from a biological and a pharmaceutical manufacturing process, and a combination thereof, with the proviso that the second specific task is not that of controlling a second environment within the second module interior, and wherein the second specific task is the same or different from the first specific task, and wherein at least one of the first component and the second component comprises a product contact surface that is disposable or single use; and a central controller configured to control and monitor in real time at least one of the first and second specific tasks in at least one of the first module and the second module and to perform information collection for the operation of the system including monitoring temperatures, humidity, differential pressures, and particle counts of the modules, the customizable, clean-room type manufacturing system thereby capable of being an alternative to separate environmentally controlled clean rooms.

2. The customizable, modular, clean-room type manufacturing system according to claim 1, further comprising a first access for accessing the first module interior and a second access for accessing the second module interior.

3. The customizable, modular, clean-room type manufacturing system according to claim 2, wherein at least one of the first access and the second access comprises at least one glove port.

4. The customizable, modular, clean-room type manufacturing system according to claim 1, wherein the first module interior and the second module interior are interconnected via respective connection ports.

5. The customizable, modular, clean-room type manufacturing system according to claim 1, wherein the manufacturing system is capable of maintaining a level of quality required for current Good Manufacturing Practice standards for drug manufacture.

6. The customizable, modular, clean-room type manufacturing system according to claim 1, wherein the on-board environmental control system comprises at least one of a heater, a refrigeration unit, a humidifier, and a dehumidifier, and combinations thereof.

7. The customizable, modular, clean-room type manufacturing system according to claim 1, wherein the on-board environmental control system comprises at least one fan unit; the first air handling system comprises an air inlet; and the second air handling system comprises an air exhaust.

8. The customizable, modular, clean-room type manufacturing system according to claim 1, wherein each of the first and second air handling systems comprises a filtration system.

9. The customizable, modular, clean-room type manufacturing system according to claim 7, wherein the each of the air inlet and the air exhaust comprises a respective filtration system.

10. The customizable, modular, clean-room type manufacturing system according to claim 4, wherein the second module is positioned downstream of the first module and wherein the pressure of the second module interior is at a higher pressure than the pressure of the first module interior, to thereby provide a flow of air from a cleaner environment to a dirtier environment.

11. The customizable, modular, clean-room type manufacturing system according to claim 1, wherein the first module comprises a first connection port positioned on a side of the first module and the second module comprises a second connection port positioned on a side of the second module, and wherein the manufacturing system further comprises a connection tube having a first end attached to the first connection port and a second end attached to the second connection port, the connection tube arranged to connect the first module interior with the second module interior.

12. The customizable, modular, clean-room type manufacturing system according to claim 1, further comprising a manufacturing space having a dedicated air handing system including a first duct for supplying air to at least one of the first module and the second module, and a second duct for gathering exhaust air from at least one of the first module and the second module, wherein the first module comprises a first air inlet of the first air handling system and a first air exhaust of the second air handling system, and the second module comprises a second air inlet of the third air handling system and a second air exhaust of the fourth air handling system and wherein the first duct comprises a snorkel connection for connecting the first duct to at least one of the first air inlet and the second air inlet and the second duct comprises a snorkel connection for connecting the second duct to at least one of the first air exhaust and the second air exhaust.

13. The customizable, modular, clean-room type manufacturing system according to claim 12, wherein the first duct and the second duct are configured such that a flow of supply air and a flow of exhaust air are from a more downstream module to a more upstream module.

14. The customizable, modular, clean-room type manufacturing system according to claim 12, further comprising a pair of interconnected modules, wherein the more downstream module is at a higher pressure than the more upstream module.

15. The customizable, modular, clean-room type manufacturing system according to claim 1, further comprising a sensor for monitoring at least one of a condition a parameter, and a combination thereof in at least one of the first module and the second module.

16. The customizable, modular, clean-room type manufacturing system according to claim 15, wherein the sensor is capable of monitoring at least one of an air flow rate into at least one of the first module and the second module; an air flow rate out of at least one of the first module and the second module; at least one of a temperature, a pressure, a humidity, and a connection of one or more components, and combinations of the foregoing.

17. The customizable, modular, clean-room type manufacturing system according to claim 1, further comprising a laminar flow zone.

18. The customizable, modular, clean-room type manufacturing system according to claim 17, wherein the laminar flow zone includes an air flow in a downward direction.

19. The customizable, modular, clean-room type manufacturing system according to claim 1, wherein the first component and the second component are each independently selected from the group consisting of: a seed culture expansion module, a bioreactor module, a filtration module, a primary recovery module, a chromatography module, a bulk drug filling module, a drug product filling module, and combinations thereof.

20. The customizable, modular, clean-room type manufacturing system according to claim 1, wherein at least one of the first module and the second module includes a sump.

21. The customizable, clean-room type manufacturing system according to claim 15, wherein at least one of the first module and the second module includes a sensor for non-viable particulates within the module.

22. The customizable, modular, clean-room type manufacturing system according to claim 1, wherein the at least one of the first module and the second module is portable.

23. The customizable, modular, clean-room type biopharmaceutical manufacturing system of claim 1 comprising a third module having a third module interior capable of being interconnected with at least one of the first module interior and the second module interior, the third module further comprising:
 a manufacturing space having a third on-board environmental control system for controlling a third environment within the third module interior and comprising a fifth air handling system for providing a third module supply air and a sixth air handling system for handling a third module exhaust air, the third module supply air system being provided with at least one of filtration, heating, cooling and or humidity control, and wherein the central controller continually monitors temperature, humidity, differential pressure, and particulates within the module interior.

24. A customizable, modular, clean-room type biopharmaceutical manufacturing system as an alternative to separate, environmentally controlled clean rooms, the manufacturing system, comprising:
 a portable module comprising a module interior adapted to maintain positive pressure during use, thereby containing and segregating an environment within the module interior from an ambient environment outside of the module;
 a component disposed within the module interior and configured to perform at least one specific task chosen from a biological and a pharmaceutical manufacturing process, with the proviso that the component comprises a product contact surface that is disposable or single use, and that the at least one specific task is not that of controlling the environment within the module interior;
 an automated on-board environmental control system associated with the portable module for controlling the environment within the module interior, wherein the on-board environmental control system maintains positive pressure within the module and comprising a first air handling system for providing supply air and a second air handling system for handling exhaust air; and wherein the on-board environmental control system continually monitors temperature, humidity, air flow, and particulates within the module interior;
 an air inlet;
 an air outlet;
 an access port for accessing the module interior of the portable, clean-room type module;
 at least one connection port for interconnecting the module interior of the portable, clean-room type module with a second module interior of a second module; and
 a central control unit in electronic communication with the portable, clean-room type module, wherein the central control unit wherein the control unit controls the specific task and performs at least one of setup, monitoring, controlling in real time, automating of the operation of the portable clean-room type module, and managing electronic batch records for the module, the portable, clean-room type module for a customizable biopharmaceutical manufacturing system thereby capable of being an alternative to an environmentally controlled clean room.

25. The customizable, modular, clean-room type manufacturing system according to claim 1, wherein each of the first air handling system, the second air handling system, third air handling system, and the fourth air handling system comprise separate fans.

26. The customizable, modular, clean-room type manufacturing system according to claim 1, wherein each of the modules includes connection ports for passing material between the modules.

27. The customizable, modular, clean-room type manufacturing system according to claim 1, wherein each of the modules includes data collection sensors that are in communication with the central controller.

28. The customizable, modular, clean-room type manufacturing system according to claim 1, wherein the central controller monitors the temperature, humidity, differential pressure, and particle counts of the modules from sensors within the modules.

29. The customizable, modular, clean-room type manufacturing system according to claim 1, further comprising a bioreactor located in the first module interior.

30. The customizable, modular, clean-room type manufacturing system according to claim 29, wherein the central controller monitors the bioreactor contained in the first module interior.

31. The customizable, modular, clean-room type manufacturing system according to claim 30, wherein the central controller monitors the bioreactor for temperature, agitation, gas flowrate, pH, and dissolved oxygen.

32. The customizable, modular, clean-room type manufacturing system according to claim 1, further comprising a filtration system located in the first module interior.

33. The customizable, modular, clean-room type manufacturing system according to claim 32, wherein the central controller monitors the filtration system for temperature, pressure, and flowrate.

34. The customizable, modular, clean-room type manufacturing system according to claim 32, further comprising a chromatography system located in the second module interior.

* * * * *